Patented Oct. 27, 1942

2,300,160

UNITED STATES PATENT OFFICE 2,300,160

ISOMERIZATION OF NORMAL PARAFFINS

Kenneth C. Laughlin, Baton Rouge, La., assignor to Standard Oil Development Company, a corporation of Delaware No Drawing. Application December 27, 1939, Serial No. 311,112

8 Claims. (Cl. 260—676)

The present invention relates to an improved method for isomerizing normal straight chain paraffin hydrocarbons, and more specifically to a new class of catalyst activators for such reaction.

It is known that normal paraffin hydrocarbons can be isomerized by means of Friedel-Crafts catalysts, such as aluminum chloride or bromide, zinc chloride, ferric chloride and the like. It is likewise known that the catalyst in almost every case requires an activator, since without such activator its activity diminishes very rapidly. As activators, hydrogen halides, such as hydrogen chloride, have been mainly employed.

It has now been found that carbon dioxide is an excellent activator for Friedel-Crafts type catalysts in the isomerization reaction, giving substantially greater yields than when a corresponding amount of a hydrogen halide is used as the activator. Carbon dioxide is, of course, a very cheap, easily handled, and readily obtainable material. Commercial isomerization processes may therefore be conducted with little added cost of catalyst activation.

The present process, in which carbon dioxide is employed as the catalyst activator, is capable of converting normal paraffins, such as normal butane, normal pentane, normal hexane, normal heptane and higher homologs, into their corresponding branched iso forms such as isobutane, isopentane, isohexane, and the like. The feed stock may also comprise mixtures of more than one of these straight chain paraffins, or, if convenient, the paraffinic hydrocarbon mixture may contain small proportions of branched chain paraffins, although for greatest efficiency the hydrocarbon feed stock should comprise essentially straight chain paraffins. Mixed paraffins, such as straight run naphthas, may thus be converted into isomeric mixtures which have an increased value with respect to anti-detonation qualities when used as motor fuels and with respect to the facility with which they may enter into further chemical reactions to produce alkylation products when reacted with olefins. In general, any hydrocarbon mixture composed predominantly of saturated straight chain hydrocarbons is suitable as a feed stock for the process herein outlined. A product containing substantial amounts of branched chain isomers may be separated from the reaction medium and fractionated within the desired boiling range. The constituents boiling above and below the desired boiling range may then be returned to the isomerization reactor to suppress their further formation or to be further isomerized to more useful products.

The carbon dioxide activator may be added to the feed stock, or it may be added to the reaction chamber by independent means so as to be distributed more evenly through the catalyst mass. It is not necessary to add the activator continuously, and it may be added from time to time as the catalyst shows deterioration. The amount of the activator varies with the catalyst, its age, the temperature and other conditions, but ordinarily the amount is from 0.5% to 5% or 10% of the feed stock treated.

The conditions for isomerizing with the present catalysts and activator are much the same as those formerly employed with the hydrogen halide activators. A wide temperature range may be employed, for example, from about 30° to about 400° F. The higher temperatures, that is, from 300° to 400° F., are preferably employed when the feed stocks are in vapor phase, and there may be some decomposition at the same time. At the lower temperatures, for example, from 70° to 250° F., isomerization may be effected in the liquid phase and without side reactions. The time of the reaction varies with other factors, such as temperature, the amount of catalyst, the particular catalyst used and the particular feed stock treated. In general, however, the time of reaction may be from ½ to 30 hours, and the conditions are usually adjusted so as to obtain a conversion of 50% to 75%, at a temperature, for example, of 150° to 250° F. for butane and 75° to 125° F. for pentane.

The amount of catalyst to be used varies widely, depending upon the particular hydrocarbon which is to be converted, the amounts ranging from 2% to 100% by weight of the hydrocarbon material present. For the conversion of butane in the presence of aluminum chloride, it is advantageous to use about 10% to about 50%, preferably about 15%, by weight of aluminum chloride and about 0.5% to about 10%, preferably about 2%, by weight of carbon dioxide.

The reaction is preferably carried out under liquid phase conditions. Hence, any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. In particular, liquid phase reactions are conducive to the production of ultimate high yields and to the carrying out of the process in a continuous manner. It is to be understood, however, that the process is not only applicable to continuous operation, but it is contemplated to carry the same out in batch type apparatus for single batch operation. Where the reaction is carried out in the liquid phase, it has been found advantageous to intensively agitate the reaction mixture so that intimate contact is established between the feed and the catalyst. The catalyst may be employed as a slurry, in which case a mechanical agitator propelled by external means is preferably inserted in the reactor. Where a batch type of catalyst is employed, it is well to employ liquid phase operation and to force the liquid hydrocarbon feed into the reactor under pressure through jets of restricted internal diameter or to employ turbo mixers or some similar dispersion means for increasing intimacy of contact between the catalyst and the feed. The direction of flow of the feed stock may be upward, or downward through the catalyst bed; but where a powdered catalyst is used, an upward flow is preferable.

In the case of batch operations, the reaction may be carried out in a bomb or autoclave, preferably fitted with agitating apparatus. In continuous flow processes the normal paraffin is passed in vapor or liquid condition through a reaction vessel containing the catalyst which may be in lump or powdered form and may be supported on a carrier such as silica, alumina gels thereof, activated carbon, asbestos, pumice, clay and the like. The hydrocarbon feed stock may be pumped through a horizontal chamber or vertical bed of the catalyst. The catalyst may also be used in finely divided form and may be passed through the reaction zone suspended in the materials being treated. The catalysts may consist entirely of Friedel-Crafts agents or may be modified by the addition of alkali or alkaline earth halides such as potassium or sodium chloride or calcium or magnesium halides.

The advantages of the present invention are illustrated by the results obtained in the following examples:

Example 1

A portion of liquefied n-butane was agitated for 12 hours at 212° F. in a closed reaction vessel in the presence of 15% by weight of aluminum chloride. Analysis of the products showed a yield of 31.7% of isobutane in a total n-butane conversion of 32.1%.

Example 2

A portion of n-butane was treated as in Example 1, but with the further addition of 2% by weight of hydrogen chloride as a catalyst activator. The results showed a yield of 42.5% of isobutane and a total n-butane conversion of 43.1%.

Example 3

A further portion of n-butane was treated as in Example 2, except that 2% by weight of carbon dioxide was employed as the activator instead of the hydrogen chloride. The results showed a yield of 50.0% of isobutane and an n-butane conversion of 69.6%.

The present invention is not to be limited by any theory of the reaction mechanism or by any of the examples, which are given by way of illustration only, but solely by the following claims in which it is desired to claim all novelty inherent in the invention.

I claim:

1. An improved process for isomerizing a normal paraffin hydrocarbon which comprises subjecting the same to the action of a Friedel-Crafts type catalyst in the presence of a catalyst activator comprising about 0.5% to about 10% by weight of carbon dioxide, based on the weight of hydrocarbon present, while at a temperature from 30° to 400° F.

2. A process according to claim 1 in which the catalyst is an aluminum halide.

3. Process according to claim 1 in which the catalyst is aluminum chloride.

4. An improved process for isomerizing a normal paraffin hydrocarbon which comprises subjecting the same in the liquid phase to the action of a Friedel-Crafts type catalyst in the presence of a catalyst agitator comprising about 0.5% to about 10% by weight of carbon dioxide based on the weight of hydrocarbon present, while at a temperature from about 70° to about 250° F.

5. Process according to claim 4 in which the catalyst is aluminum chloride.

6. An improved process for isomerizing normal butane which comprises subjecting the same to the action of a Friedel-Crafts type catalyst in the presence of a catalyst activator comprising about 0.5% to about 10% by weight of carbon dioxide, based on the weight of the hydrocarbon present, while at a temperature from 150° to 250° F.

7. An improved process for isomerizing normal butane which comprises subjecting the same to the action of about 10% to about 50% by weight of aluminum chloride and about 0.5% to about 10% by weight of carbon dioxide while at a temperature from 150° to 250° F.

8. An improved process for isomerising normal butane which comprises subjecting the same to the action of about 15% by weight of aluminum chloride and 2% by weight of carbon dioxide while at a temperature of about 212° F.

KENNETH C. LAUGHLIN.